INVENTOR
DOMER SCARAMUCCI

July 28, 1970  D. SCARAMUCCI  3,521,666
RECIPROCATING VALVE ASSEMBLY
Filed April 18, 1969  3 Sheets-Sheet 2

INVENTOR
DOMER SCARAMUCCI
BY
Dunlap, Laney, Hessin & Dougherty
ATTORNEYS

July 28, 1970 D. SCARAMUCCI 3,521,666
RECIPROCATING VALVE ASSEMBLY
Filed April 18, 1969 3 Sheets-Sheet 3

INVENTOR
DOMER SCARAMUCCI
BY
Dunlap, Laney, Hessin, & Dougherty
ATTORNEYS

# United States Patent Office 3,521,666
Patented July 28, 1970

3,521,666
RECIPROCATING VALVE ASSEMBLY
Domer Scaramucci, 3245 S. Hattie,
Oklahoma City, Okla. 73129
Filed Apr. 18, 1969, Ser. No. 817,497
Int. Cl. F16k 27/00, 51/00
U.S. Cl. 137—454.2
17 Claims

ABSTRACT OF THE DISCLOSURE

A valve assembly, particularly useful between flanges, which utilizes a housing unit and a separate valve unit. The housing unit provides a support housing adapted to be supported between the flanges and includes a valve operator and a valve stem. The valve unit includes the valve member, valve body, and valve seats, and is sized to be inserted in the housing unit, and is supported therein. The valve member has a portion thereof adapted to interconnect with the valve stem so that the position of the valve member with respect to the valve seats may be controlled.

CROSS REFERENCE TO RELATED APPLICATIONS

This application is a continuation-in-part of applicant's co-pending application entitled "Valve Assembly With Insertable Valve Unit," Ser. No. 763,644, filed Sept. 30, 1968.

BACKGROUND OF INVENTION

Field of the invention

This invention relates generally to improvements in valve assemblies utilizing a housing unit and a separate valve unit, and more particularly, but not by way of limitation, to an improved reciprocating valve assembly utilizing a housing unit and separate valve unit.

Description of the prior art

There have been reciprocating type valve assemblies in the past wherein the valve seat has been insertable in a valve body, and is supported therein. In this type of assembly the valve member is generally secured to the valve stem, and if replaceable at all, is a separate part requiring an additional assembly or disassembly procedure.

The effectiveness of the seal attained in a particular valve assembly is accomplished by the valve member in cooperation with the valve seat. Thus, even though a worn seat is replaced, the sealing effectiveness of the valve assembly is not greatly increased if the valve member is also worn. Using the previous type of reciprocating valve assembly, it is also possible to replace a worn valve seat with a new valve seat which does not exactly mate with the original valve member, and thus the result is a further loss in sealing effectiveness.

SUMMARY OF THE INVENTION

The present invention contemplates a valve assembly for controlling the flow of fluid through adjacent pipe sections. The valve assembly includes a housing supported between the adjacent ends of the pipe sections, having opposite end faces and a bore extending therethrough. A valve stem is journaled in the housing, and has upper and lower end portions. A valve operator is supported by the housing and is connected to the upper end portion of the valve stem to reciprocate the valve stem in the housing. The valve assembly also includes a valve unit having a valve body which is adapted to be inserted lengthwise into the housing. The valve body has opposite ends and a bore extending a distance therethrough intersecting one of the opposite ends. The valve body includes aperture means which extend therethrough communicating with the bore in the valve body. The outer periphery of the valve body is sized such that when the valve body is inserted in the housing, the valve body will not contact the housing. A flange portion is formed on the end of the valve body adjacent the intersection of the bore through the valve body. The flange portion is sized to contact the housing and cooperate therewith to support the valve body in the housing. A valve member is seatingly supported in the aperture means of the valve body for opening and closing the valve assembly. A stem connector is provided to interconnect the valve member and the valve stem, so that the valve member is removed from and returned to the seating position in the aperture means as the valve stem is reciprocated by the valve operator. A seat is provided to seal between the valve body and the valve member when the valve member is in the closed position.

An object of the invention is to facilitate the repair of valve assemblies in the field.

Another object of the invention is to provide a reciprocating type valve assembly wherein the valve seat and valve member are removable and insertable as a unit.

A further object of the invention is to provide a reciprocating type valve assembly wherein the valve seat and valve member may be removed without having to remove the valve operator or valve stem.

A further object of the invention is to provide a reciprocating type valve assembly which may be economically manufactured, repaired in the field in a minimum amount of time, and will have a long service life.

Other objects and advantages of the invention will be evident from the following detailed description when read in conjunction with the accompanying drawings which illustrate the preferred embodiments of the invention.

DESCRIPTION OF THE PREFERRED EMBODIMENT

Figure 1:
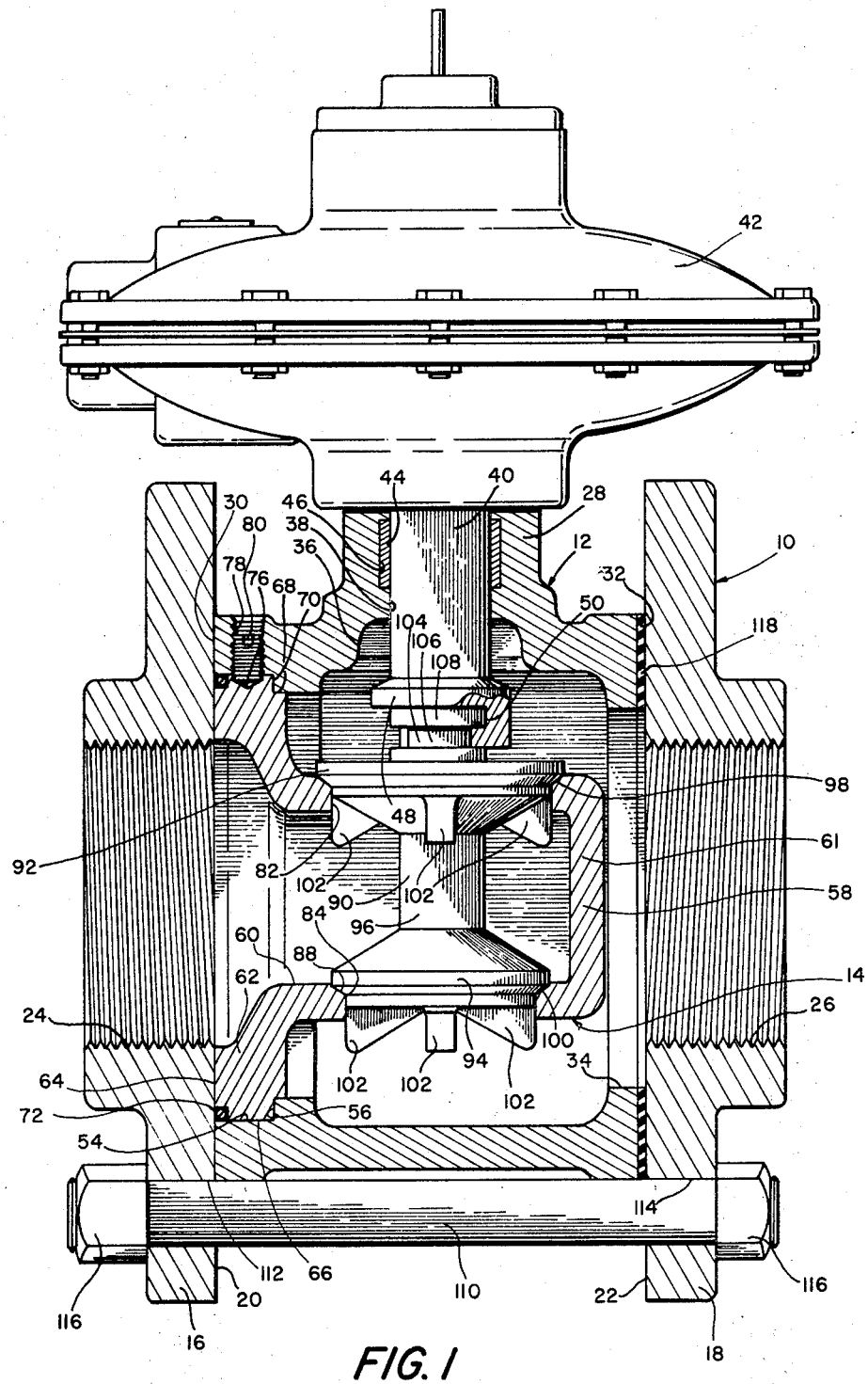
FIG. 1 is a partial sectional and partial elevational view of a valve assembly, assembled between two flanges.

Referring to the drawings in detail, and to FIG. 1 in particular, shown therein and designated by the general reference character 10, is a valve assembly constructed in accordance with the invention. The valve assembly 10 basically comprises a housing unit 12 and a valve unit 14.

The valve assembly 10 is disposed generally between flanges 16 and 18. Each of the flanges 16 and 18 includes an end face 20 or 22, and a threaded opening 24 or 26, respectively. The threaded openings 24 and 26 are axially aligned and sized to receive the threaded ends of adjacent sections of a conduit (not shown).

The housing unit 12 includes a tubular housing 28 having opposite end faces 30 and 32, and a bore 34 extending therethrough intersecting the end faces 30 and 32. A cylindrical recess 36 is formed in the upper portion of the housing 28 to accommodate the valve stem as it is reciprocated radially in the housing 28, as will be described in greater detail hereinafter. An aperture 38 extends transversely through the housing 28 and intersecting the recess 36. A valve stem 40 extends through and is journaled in the aperture 38. Thus, the center line of the valve stem 40 extends generally at a right angle to the center line of the bore 34 of the housing 28.

The upper portion (not shown) of the valve stem 40 is adapted to be connected to a valve operator 42. The valve operator 42 reciprocates the valve stem 40 in the aperture 38. As well known in the art, various forms of valve operators are available to perform this particular function. In one form, for example, the valve operator 42 could be of the diaphragm, air-operated type, such as available from Fisher Governor Company, Marshalltown, Iowa. This form of the valve operator 42 would reciprocate the valve stem 40 in response to a control air signal, which is fed to the valve operator 42 through appropriate connectors. It is also apparent that other types of operators may be used, such as electro-mechanical type operators, or even hand-operated type operators.

A seal member 44 is disposed in an annular groove 46, formed in the walls of the aperture 38, to provide a fluid tight seal between housing 28 and valve stem 40. In one form, the seal member 40 may be bonded in the groove 46.

A flange portion 48 is formed on the lowermost end portion of the valve stem 40. A T-shaped slot 50 is formed in the flange portion 48 and extends from one side of the flange portion for purposes to be described.

A counterbore 54 is provided in the bore 34 of the housing 28, and intersects the end face 30 thereof. The counterbore 54 forms an annular wall 56 in the housing 28 facing in the same direction as the face 30.

Valve unit 14 includes a hollow valve body 58 forming a valve chamber 60 and having one closed end 61. A circumferential flange 62 is formed around the opposite, open end portion of the body 58 to support the body 58 centrally in the housing bore 34. The flange portion 62 has an end face 64 and an outer periphery 66 sized to slidingly and matingly fit in the counterbore 54 of the housing 28. It is apparent that the end face 64 of the flange portion 62 also forms the end face of the valve body 58, and will sometimes hereinafter be referred to as the end face of the valve body. A groove 68 is formed in the outer periphery 66 of the flange portion 62. The groove 68 intersects the end of the flange portion 62 opposite the end face 64, and forms an annular wall 70 around a portion of the flange portion 62 positioned to engage the end wall 56 of the housing counterbore 54.

A second groove 72 is formed in the outer periphery 66, and intersects the end face 64 of the flange portion 62. An O-ring seal member 74 is disposed in the groove 72 and is sized to sealingly engage the valve body 58, the housing 28 and the end face 20 of the flange 16 when in valve unit 14 is in an assembled position, as shown in FIG. 1.

A recess 76 is formed in the outer periphery 66 of the flange portion 62, and in an assembled position, the recess 76 is aligned with a threaded aperture 78 which extends through the housing 28. A threaded set screw 80 extends through the aperture 78 and into the recess 76, and thereby secures the valve body 58 in position with respect to the housing 28.

Upper and lower apertures 82 and 84 extend through the valve body 58 intersecting the valve chamber 60. The apertures 82 and 84 are radially aligned, and each has a frusto-conical seating surface 86 or 88, respectively, formed on the upper end portion thereof.

A balanced valve member 90 is disposed in the upper and lower apertures 82 and 84 of the valve body 58. The valve member 90 has upper and lower valve heads 92 and 94 interconnected by a connecting portion 96. The lower valve head 94 an outer diameter less than the diameter of the upper aperture 82 to permit installation of the valve member 90 as will be noted below. Each of the valve heads 92 and 94 has a frusto conical seating surface 98 or 100, respectively, formed around the outer periphery thereof. The seating surfaces 98 and 100 are sized to seatingly and sealingly engage the seating surfaces 86 and 88, respectively, when the valve member 90 is in a closed position, as shown in FIG. 1. Each of the valve heads 92 and 94 has a plurality of guide flange members 102 formed on the lower end thereof to slidingly engage the respective aperture 82 or 84 and guide the valve member 90 into a proper seating position when the valve member 90 is moved to closed position.

A stem connector 104 is formed on the upper portion of the upper valve head 92. The stem connector 104 has a groove 106 around the portion of the outer periphery thereof, thereby forming an upper flange portion 108 on the uppermost end portion of the stem connnector 104. The upper flange portion 108 and the groove 106 are sized to matingly and interconnectingly fit in the slot 50 of the valve stem 40 when the valve assembly 10 is in the assembled position, thereby providing the interconnection therebetween.

The housing unit 12, the valve unit 14 and the flanges 16 and 18 are held in an assembled relationship by a plurality of bolts 110. Each bolt 110 extends through an aperture 112 in the flange 16, about the outer periphery of the housing 28, and through an aperture 114 in the flange 18. Each of the bolts 110 is provided with a pair of threaded nuts 116 that engage the flanges 16 and 18.

A seal gasket 118 is disposed between the end face 32 of the housing 28 and the end face 22 of the flange 18. The seal gasket 118 forms a fluid tight seal between the housing 28 and the flange 18 when the valve assembly 10 is in an assembled position.

OPERATION OF FIGS. 1 AND 2

The valve unit 14 and the housing unit 12 are combined to form the valve assembly 10 by first inserting the valve stem 40 upwardly through the aperture 38 of the housing 28. The valve operator 42 is then connected to the valve stem 40, such that on a given response the valve operator 42 will cause the valve stem 40 to reciprocate within the aperture 38. The valve stem 40 is turned so that the open end of the T-shaped slot 50 generally faces the end face 30 of the housing 28.

Figure 2:
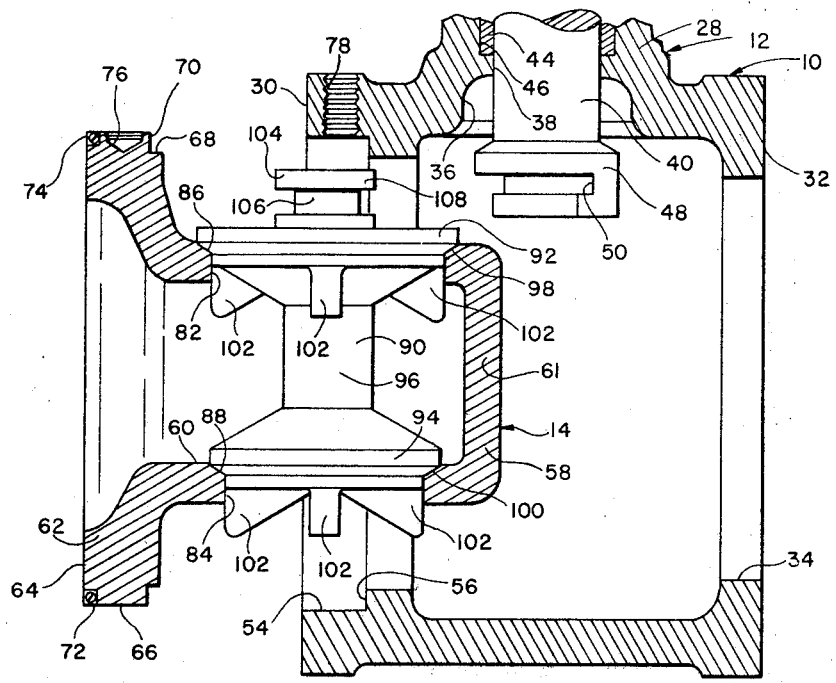
FIG. 2 is a sectional view of a portion of the valve assembly of FIG. 1, but showing the valve unit partially removed from the housing unit.

The balanced valve member 90 is inserted downwardly through the upper aperture 82 of the valve body 58 to a position wherein the seating surfaces 98 and 100 of the valve member 90 seatingly engage the seating surfaces 86 and 88, respectively, of the valve body 58. As shown in FIGS. 1 and 2, the valve member 90 is thus supported by the valve body 58.

The valve unit 14 is inserted lengthwise into the bore 34 of the housing 28. The diameter of the outer periphery of the valve body 58 is less than the diameter of the bore 34 of the housing 28, so that the valve body 58 will not engage the housing 28 as the valve unit 14 is inserted in the housing unit 12. The valve unit 14 is inserted lengthwise into the housing unit 12 to a position wherein the upper flange portion 108 of the stem connector 104 matingly fits in the T-shaped slot 50 of valve stem 40, thereby forming the interconnection therebetween.

In the assembled position of the valve unit 14, the wall 70 formed by the groove 68 will engage the wall 56 formed by the counterbore 54 in the housing 28. In the position of the valve unit 14 described hereinabove, the stem connector 104 of the valve member 90 is generally radially aligned with the valve stem 40, and the end face 64 of the valve body 58 is aligned with the end face 30 of the housing 28. The valve body 58 is then positioned such that the recess 76 of the valve body 58 is aligned with the threaded aperture 78 of the housing 28. The set screw 80 is then inserted through the apertures 78 and 76, threadingly engaging same, and thereby securing the valve unit 14 in position with respect to the housing unit 12. The set screw 80 will also hold the valve unit 14 and the housing unit 12 in place during shipment, so that they may be shipped in a more compact and secure manner.

The O-ring 74 is then disposed in the second annular groove 72 of the valve body 58, and the flange 16 is placed in a position such that the end face 20 of the flange 16 abuts the end faces 30 and 64 of the housing 28 and the valve body 58, respectively. The seal gasket 118 is placed adjacent the end face 32 of the housing 28, and the flange 18 is positioned such that the end face 22 of the flange 18 abuts the seal gasket 116.

The bolts 108 are then inserted through the respective apertures 112 and 114 of the flanges 16 and 18. The threaded nuts 116 are secured on the opposite ends of each bolt 108, thereby securing the valve unit 14 and the housing unit 12 in an assembled position, as shown in FIG. 1.

In the normal operation of the valve assembly 10 the fluid will flow in a direction generally from the opening 24 of the flange 16 through the valve unit 14 and housing unit 12, and out through the opening 26 of the flange 18. As shown in FIG. 1, the valve member 90 is in the closed position, that is in a position wherein the seating surfaces 98 and 100 of the upper and lower valve heads 92 and 94 are seatingly and sealingly engaging the seating surfaces 86 and 88, respectively, of the upper and lower apertures 82 and 84. In this position, fluid will not flow through the valve assembly 10.

In the closed position, the fluid pressure acting on the upper portion of the lower valve head 94 and on the lower portion of the upper valve head 92 will provide substantially balanced forces and only a minimal upward force will be exerted tending to open the valve.

When the valve operator 42 is actuated to open the valve assembly 10, the valve stem 40 is reciprocated in an upward direction through the aperture 38 in the housing 28. Due to the interconnection between the valve stem 40 and the stem connector 104, the valve member 90 will be removed from its seating position as the valve stem 40 is raised, thereby allowing fluid to pass through the upper and lower apertures 82 and 84 and the valve unit 14. Due to the substantially balanced effect of the fluid pressure, described hereinbefore, the fluid pressure will not materially affect the ability of the valve member 90 to open and close.

The O-ring 74 disposed in the groove 72 sealingly engages the end face 20 of the flange 16, the surface formed by the counterbore 54 of the housing 28 and the surface formed by the counterbore 72 in the valve body 58, thereby forming a fluid tight seal therebetween. Also, the seal gasket 116 disposed between the flange 18 and the end face 32 of the housing 28 will form a fluid tight seal therebetween.

It is apparent that the invention as described hereinbefore provides a valve assembly wherein the valve unit and the housing unit are separate interchangeable components. The valve unit includes the valve body and the seating surfaces for the valve member. The valve member is supported in the valve body in such a manner that the valve unit, including the valve member, can be inserted lengthwise into the housing unit. The valve unit may therefore be quickly and easily removed or installed in a given housing unit, thereby facilitating field repair of the valve. Since the valve member and the valve body, including the seating surfaces are removable as a unit, the valve assembly 10 minimizes the possibility of installing a defective valve member or a defective seating surface after repair of a given valve.

EMBODIMENT OF FIG. 3

Figure 3:
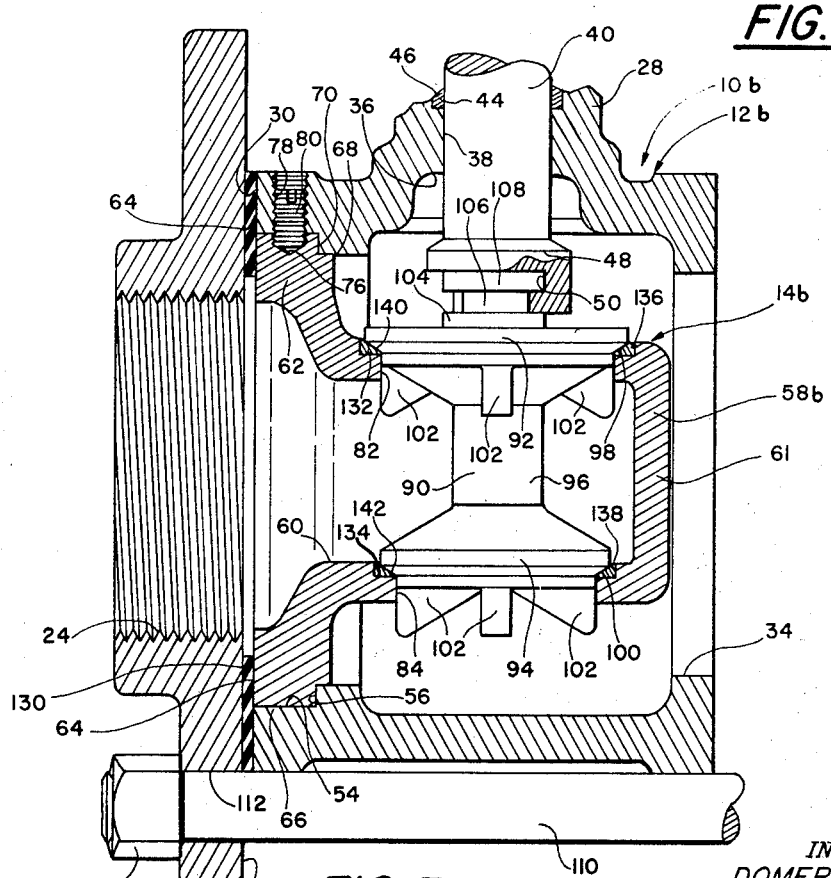
FIG. 3 is a view similar to FIG. 1, but illustrating a portion of a modified valve assembly.

A slightly modified valve assembly 10b is shown in FIG. 3. The valve assembly 10b is constructed the same as the valve assembly 10, shown in FIGS. 1 and 2, except as hereinafter described.

The valve assembly 10b does not include a groove and an O-ring similar to the O-ring 74 and the groove 72 of the valve assembly 10, but rather the valve assembly 10b includes a seal gasket 130 disposed between the end face 20 of the flange 16 and the end faces 30 and 64 of the housing 28 and the valve body 58b. The seal gasket 130 thus forms the fluid tight seal between the valve unit 14b, the housing unit 12b and flange 16.

A groove 132 is formed around the upper edge of the upper aperture 82, and a similar groove 134 is formed around the upper edge of the lower aperture 84. Elastomeric seal members 136 and 138 are bonded in the grooves 132 and 134, respectively. Each of the seal members 136 and 138 has a seating surface 140 or 142, respectively, formed thereon. The seating surfaces 140 and 142 are sized to seatingly and sealingly engage the seating surfaces 98 and 100 of the upper and lower valve heads 92 and 94, respectively, when the valve assembly is in the closed position, as shown in FIG. 3.

OPERATION OF FIG. 3

The operation of the valve assembly 10b is very similar to the operation of the valve assembly 10, shown in FIGS. 1 and 2, the salient differences being that the seal member 130 will provide the fluid tight seal between the valve body 58b, the housing 28, and the flange 16, and the seal members 136 and 138 will provide the fluid tight seal between the valve member 90 and the valve body 58b when the valve member 90 is in the closed position.

It is therefore apparent that the valve assembly 10b retains all of the advantages of the valve assembly 10, and has the additional advantage of providing an elastomeric type seal to be used in cooperation with the valve member. This type of seal is of course desirable or preferable in certain applications over a metal-to-metal type of sealing.

EMBODIMENT OF FIG. 4

Figure 4:
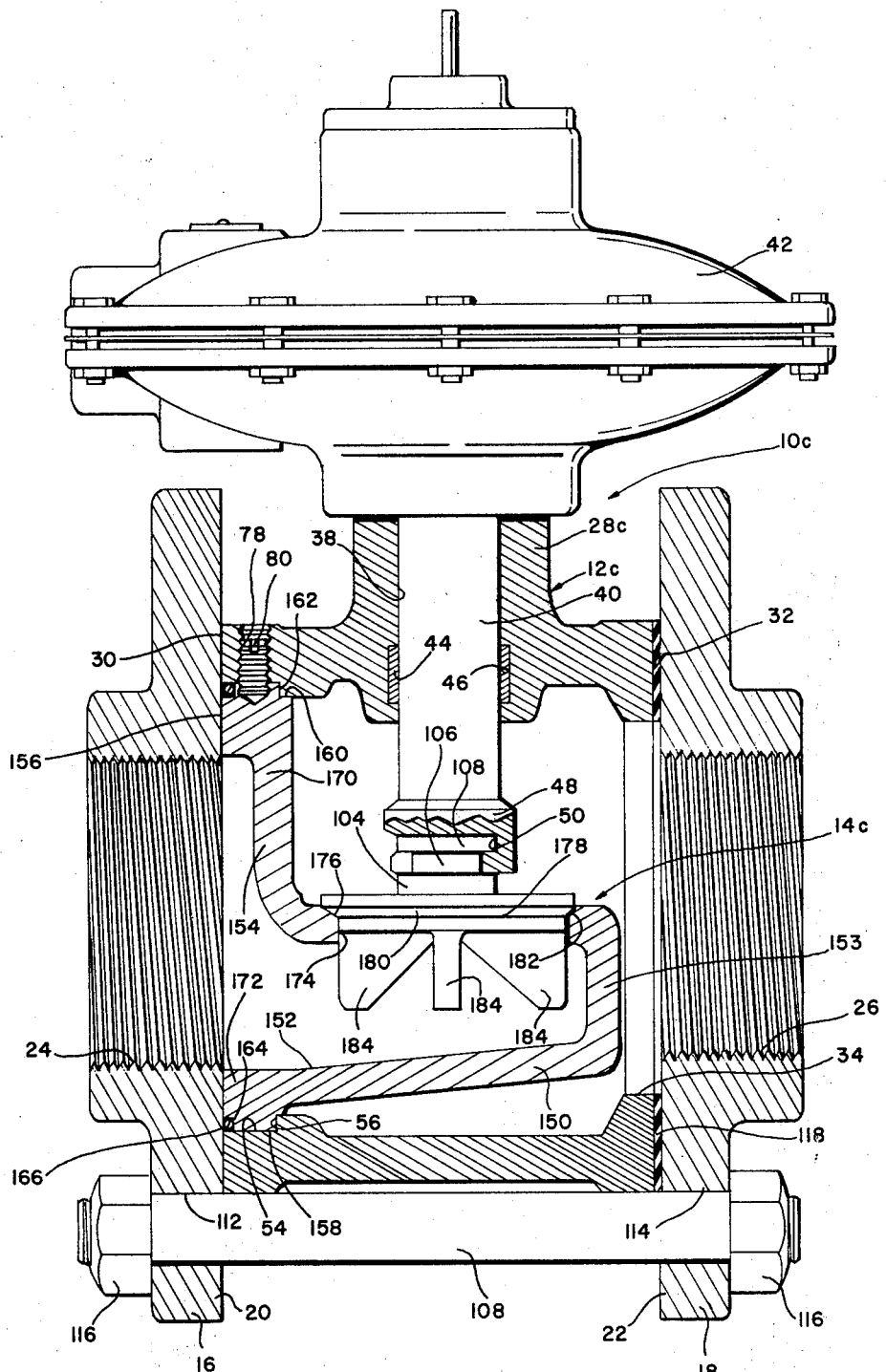
FIG. 4 is a view similar to FIG. 1 but illustrating another modified valve assembly.

Shown in FIG. 4 is a modified valve assembly 10c, which is similar to the valve assembly 10, shown in FIGS. 1 and 2. The valve assembly 10c includes a housing unit 12c and a valve unit 14c.

The housing unit 12c is constructed in the same manner as the housing unit 12 except, in a preferred form, the housing 28c does not have a recess formed in the upper portion thereof similar to the recess 36 in the housing 28. The reason the recess is not required in this embodiment of the invention will be made apparent hereinafter.

The valve unit 14c includes a hollow valve body 150 forming a valve chamber 152 and having one closed end 153. An eccentric, circumferential flange portion 154 is formed on the opposite end of the valve body 150. The flange portion 154 has an end face 156 and an outer periphery 158 sized to slidingly and matingly fit in the counterbore 54 of the housing 28c. A groove 160 is formed in the outer periphery 158 of the flange portion 154. The groove 160 intersects the end of the flange portion 154 opposite the end face 64, and forms an annular wall 162 around a portion of the flange portion 154 positioned to engage the wall 56 formed by the housing counterbore 54.

A second groove 164 is formed in the outer periphery 158 and intersects the end face 156 of the flange portion 154. An O-ring seal 166 is disposed in the groove 164 and is sized to sealingly engage the valve body 150, the housing 28c and the end face 20 of the flange 16.

A recess 168 is formed in the outer periphery 158 of the flange portion 154, and in an assembled position, the recess 168 is aligned with the threaded aperture 78 which extends through the housing 28c. The threaded set screw 80 extends through the aperture 78 into the recess 168, and secured the valve body 150 in position in a manner similar to that previously described with respect to the valve body 58.

The flange portion 154, as shown in FIG. 4, extends radially from one end of the valve body 150. The upper portion 170 of the flange portion 154 extends a greater distance from the valve body 150 than does the lower portion 172 of the flange portion 154. In an assembled position, the lower portion 172 is oriented generally adjacent the lower portion of the housing 28c. Thus, the valve body 150 will be positioned closer to the lower portion of the housing 28c, thereby leaving a larger area between the upper portion of the valve body 150 and the upper portion of the housing 28c than was the case in the valve body 58 shown in FIGS. 1 and 2.

An aperture 174 extends through the valve body 150, intersecting the valve chamber 152. The aperture 174 has a frusto-conical seating surface 176 formed around the upper end portion thereof.

A valve member 178 is disposed in the aperture 174 of the valve body 150. The valve member 178 comprises a valve head 180 having a frusto-conical seating surface 182 formed around the outer periphery thereof, and a plurality of guide flanges 184, formed on the lower end thereof. The seating surface 182 is sized and positioned to sealingly and seatingly engage the seating surface 176 of the valve body 150 when the valve member 178 is in the closed position. The guide flanges 184 guide the valve member 178 into a proper seating position when the valve member 178 is moved to the closed position.

A stem connector 104 is formed on the upper portion of the valve head 178, and is identical in construction to the stem connector 104, shown in FIGS. 1 and 2, therefore the same numerical designation is used in FIG. 4.

It is apparent from the foregoing that the salient difference between the valve assembly 10c and the valve assembly 10, is that the valve assembly 10c utilizes a valve member having a single valve head.

OPERATION OF FIG. 4

The operation of the valve assembly 10c is very similar to the operation of the valve assembly 10.

The valve member 178 is disposed in the aperture 174 of the valve body 150, in a position wherein the seating surface 182 of the valve member 178 seatingly engages the seating surface 176 of the valve body 150. In this position, the valve member 178 is supported by the valve body 150.

After the valve stem 40 has been inserted in the aperture 38 of the housing 28c and interconnected to the valve operator 42, the valve unit 14c is inserted lengthwise into the bore 34 of the housing 28c. The diameter of the outer periphery of the valve body 150 is substantially less than the diameter of the bore 34 of the housing 28c, so that the valve body 150 will not engage the housing 28c as the valve unit 14c is inserted therein. The valve unit 14c is inserted into the housing 28c to a position wherein the stem connector 104 connectingly engages the valve stem 40, in a manner exactly as described hereinbefore.

In the assembled position of the valve unit 14c, the wall 162 formed by the groove 160 will engage the wall 56 formed by the counterbore 54 in the housing 28c. The valve body 150 is then positioned such that the recess 168 thereof is aligned with the threaded aperture 78 in the housing 28c. The set screw 80 is then inserted through the apertures 78 and 156, threadingly engaging same, and thereby securing the valve unit 14c in the assembled position.

In the assembled position, the valve body 150 is oriented to be closer to the lower portion of the housing 28c than to the upper portion thereof, as described hereinbefore.

The O-ring 166 is then disposed in the second annular groove 164 of the valve body 150, and the flange 16 is placed in a position such that the end face 20 thereof abuts the end faces 30 and 156 of the housing 28c and the valve body 150, respectively. The seal gasket 118 is then placed in position exactly as described hereinbefore with respect to the valve assembly 10.

The valve unit 14c, the housing unit 12c and the flanges 16 and 18 are held in an assembled relationship by the bolts 108, in a manner as described hereinbefore.

In the normal operation of the valve assembly 10c, the fluid will flow in a direction generally from the opening 24 of the flange 16 through the valve unit 14c and the housing unit 12c, and out through the opening 26 of the flange 18. As shown in FIG. 4, the valve member 178 is in the closed position, that is in a position wherein the seating surface 182 of the valve member 178 is seatingly and sealingly engaging the seating surface 176 of the valve body 150. In this position of course, fluid will not flow through the valve assembly 10c.

When the valve stem 40 is moved in an upward direction by the valve operator 42, the valve member 178 will be removed from its seating position in the valve body 150, thereby allowing fluid to pass through the aperture 174 of the valve body 150. Since the valve body 150 is positioned closer to the lower portion of the housing 28c, a larger area will exist between the valve body 150 and the upper portion of the bore 34. The gap is provided to accommodate the lower portion of the valve stem 40 as it is moved upwardly in the aperture 38, and therefore no recess is required in the housing 28c similar to the recess 36 in the housing 28.

It is apparent that the valve assembly 10c retains all of the advantages of the valve assembly 10, but shows a construction using a single-headed valve member. It is also apparent that an elastomeric type sealing member could be incorporated in the valve assembly 10c, similar to the seal members 136 and 138 shown in FIG. 3, of course only one such seal member would be required in the valve assembly 10c.

From the foregoing it is apparent that the valve assemblies disclosed herein provide a reciprocating valve assembly wherein the valve unit is insertable and removable as a unit. Thus field repair of the valve assembly is not only simpler and quicker, but the valve member and its cooperating seating surfaces are inspected and installed as a unit-type operation, thereby virtually eliminating the possibility of replacing one and leaving the other in a defective condition.

Changes may be made in the construction and arrangement of parts or elements of the various embodiments as disclosed herein without departing from the spirit and scope of the invention.

What is claimed is:

1. A valve assembly for controlling the flow of fluid through adjacent pipe sections, comprising:
 a housing unit, including:
  a housing having opposite end faces and a bore extending therethrough;
  means supporting the housing between the adjacent ends of the pipe sections;
  a valve stem journaled in the housing in a position projecting into the housing bore, and having upper and lower end portions;
  valve operating means supported by the housing and connected to the upper end portion of the valve stem to reciprocate the valve stem in the housing; and
 a valve unit, including:
  a hollow valve body having an open end and a closed end and being of a size to be inserted lengthwise into the housing bore, said valve body having aperture means therein communicating with the interior of the body and being aligned with the valve stem;
  means for supporting the valve body in the housing bore;
  a valve member seatingly supported in the aperture means of the valve body for opening and closing the valve assembly and being of a size to be inserted in the housing bore with the valve body; and
  a stem connector means to interconnect the valve member and the valve stem when the valve body and valve member are inserted in the housing bore, whereby the valve member is removed from and returned to the seating position in the aperture means as the valve stem is reciprocated by the valve operating means.

2. The valve assembly of claim 1 wherein the lower end portion of the valve stem includes a T shaped slot formed in the lower end portion thereof, said T shaped slot extending from one side of the valve stem.

3. The valve assembly of claim 1 wherein the housing includes a recess generally adjacent the valve steam, to accommodate a portion of the valve stem as the valve stem is reciprocated in the housing.

4. The valve assembly of claim 1 wherein the transverse dimensions of the valve body are less than the diameter of the bore in the housing, so that when the valve body is inserted in the housing, the valve body will not contact the housing.

5. The valve assembly of claim 1 wherein the means supporting the housing between the adjacent ends of the pipe sections is defined further to include:
   a flange at each end of the valve assembly, each of said flanges having an end face facing the valve assembly; and
   a plurality of circumferentially spaced bolts extending through each of the flanges respectively and about the outer periphery of the housing.

6. The valve assembly of claim 5 wherein the means supporting the valve body in the housing comprises:
   a flange portion formed on the opened end of the valve body, said flange portion forming an end face surface on the valve body and being sized to contact the housing and to cooperate therewith to support the valve body in the housing.

7. The valve assembly of claim 6 wherein the housing includes a counterbore adjacent one end thereof; and wherein the flange portion on the valve body is sized to matingly fit in said counterbore, thereby positioning the valve body in the housing.

8. The valve assembly of claim 6 wherein the flange portion includes a groove around a portion of the outer periphery thereof intersecting the end face of the flange portion; and wherein the valve assembly is further defined to include an O-ring seal member disposed in said groove, said O-ring being sized to sealingly engage the flange portion of the valve body, the housing, and the end face of the adjacent flange.

9. The valve assembly of claim 6 defined further to include a seal gasket disposed between the end face of the flange portion, the respective end face of the housing, and the respective end face of one of the flanges, thereby forming a fluid tight seal therebetween.

10. The valve assembly of claim 7 defined further to include a seal gasket disposed between the end face of the housing opposite the end face thereof having the counterbore therein, and the end face of the adjacent flange, thereby forming a fluid tight seal therebetween.

11. The valve assembly of claim 7 wherein the flange portion of the valve body extends approximately the same radial distance from the valve body around the entire circumference of the valve body, thereby positioning the valve body centrally in the bore of the housing.

12. The valve assembly of claim 11 wherein the aperture means in the valve body includes an upper aperture and a lower aperture, said upper and lower apertures being aligned; and wherein the valve member, comprises:
   an upper valve head sized to seatingly and sealingly engage the valve body adjacent the upper aperture, when the valve member is in the closed position;
   a lower valve head sized to seatingly and sealingly engage the valve body adjacent lower aperture, when the valve member is in the closed position, said lower valve head being sized such that it may be inserted downwardly through said upper aperture; and
   a connecting means connecting the upper valve head to the lower valve head.

13. The valve assembly of claim 12 wherein the upper and lower apertures each include a groove around the periphery thereof; and wherein the valve assembly is defined further to include:
   a seal member disposed in the groove around the upper aperture, said seal member being sized to sealingly and seatingly engage the upper valve head when the valve assembly is in the closed position; and
   a seal member disposed in the groove around the lower aperture, said seal member being sized to sealingly and seatingly engage the lower valve head when the valve assembly is in the closed position.

14. The valve assembly of claim 12 wherein the upper and lower valve heads each include a plurality of guide flanges extending therefrom, to guide the upper and lower valve heads, respectively, into the proper seating position in the upper and lower apertures in the valve body, respectively.

15. The valve assembly of claim 6 wherein the housing includes an upper and a lower portion, and the valve stem is journaled in the upper portion of the housing; and wherein the flange portion extends eccentrically from the valve body, so that when the valve body is inserted in the housing, the valve body is positioned closer to the lower portion of the housing.

16. The valve assembly of claim 15 wherein the aperture means includes an aperture having a seating surface formed therearound; and wherein the valve member comprises:
   a valve head sized to seatingly and sealingly engage seating surface formed around said aperture, when the valve member is in the closed position.

17. The valve assembly of claim 16 wherein the valve head includes a plurality of guide flanges extending therefrom to guide the valve head into the proper seating position in the aperture in the valve body.

References Cited

UNITED STATES PATENTS

| | | | |
|---|---|---|---|
| 417,134 | 12/1889 | Bell | 137—454.2 X |
| 2,730,119 | 11/1956 | Bredtschneider | 137—454.2 X |
| 2,895,496 | 7/1959 | Sanctuary | 251—15 X |
| 3,025,873 | 3/1962 | Ray | 137—454.2 |

ARNOLD ROSENTHAL, Primary Examiner

U.S. Cl. X.R.

137—625.36; 251—148